(12) United States Patent
Thiel

(10) Patent No.: US 8,686,319 B2
(45) Date of Patent: Apr. 1, 2014

(54) VEHICLE TRANSPARENCY HEATED WITH ALTERNATING CURRENT

(75) Inventor: James P. Thiel, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1138 days.

(21) Appl. No.: 11/746,266

(22) Filed: May 9, 2007

(65) Prior Publication Data

US 2008/0277320 A1    Nov. 13, 2008

(51) Int. Cl.
*H05B 3/84* (2006.01)

(52) U.S. Cl.
USPC ............................... 219/203; 219/522

(58) Field of Classification Search
USPC ........... 219/203, 522, 543; 244/121; 296/84.1
See application file for complete search history.

(56) References Cited

U.S. PATENT DOCUMENTS

| | | | |
|---|---|---|---|
| 3,762,988 A | 10/1973 | Clock et al. | |
| 3,895,213 A | 7/1975 | Levin | 219/203 |
| 4,084,126 A * | 4/1978 | Clements | 322/8 |
| 4,287,107 A | 9/1981 | Hermann et al. | |
| 4,379,040 A | 4/1983 | Gillery | |
| 4,387,290 A * | 6/1983 | Yasuda | 219/202 |
| 4,459,470 A * | 7/1984 | Shlichta et al. | 219/522 |
| 4,466,562 A | 8/1984 | DeTorre | |
| 4,504,109 A | 3/1985 | Taga et al. | |
| 4,610,771 A | 9/1986 | Gillery | |
| 4,671,155 A | 6/1987 | Goldinger | |
| 4,716,086 A | 12/1987 | Gillery et al. | |
| 4,725,710 A * | 2/1988 | Ramus et al. | 219/203 |
| 4,746,347 A | 5/1988 | Sensi | |
| 4,792,536 A | 12/1988 | Pecoraro et al. | |
| 4,806,220 A | 2/1989 | Finley | |
| 4,820,902 A | 4/1989 | Gillery | |
| 4,834,857 A | 5/1989 | Gillery | |
| 4,861,669 A | 8/1989 | Gillery | |
| 4,898,789 A | 2/1990 | Finley | |
| 4,898,790 A | 2/1990 | Finley et al. | |
| 4,900,633 A | 2/1990 | Gillery | |
| 4,902,580 A | 2/1990 | Gillery | |
| 4,920,006 A | 4/1990 | Gillery | |
| 4,938,857 A | 7/1990 | Gillery | |
| 4,948,677 A | 8/1990 | Gillery | |
| 4,952,423 A | 8/1990 | Hirata et al. | |
| 5,028,759 A | 7/1991 | Finley | |
| 5,030,593 A | 7/1991 | Heithoff | |
| 5,030,594 A | 7/1991 | Heithoff | |
| 5,057,763 A * | 10/1991 | Torii et al. | 322/8 |
| 5,059,295 A | 10/1991 | Finley | |
| 5,240,886 A | 8/1993 | Gulotta et al. | |

(Continued)

FOREIGN PATENT DOCUMENTS

| | | |
|---|---|---|
| GB | 2146880 A | 4/1985 |
| GB | 2 302 102 | 1/1997 |

OTHER PUBLICATIONS

U.S. Appl. No. 11/746,247, filed May 9, 2007.

*Primary Examiner* — Henry Yuen
*Assistant Examiner* — John Wasaff
(74) *Attorney, Agent, or Firm* — Andrew C. Siminerio

(57) ABSTRACT

A heatable transparency comprises a substrate and an electrically conductive coating formed over at least a portion of the substrate. A power supply is in contact with the conductive coating. The power supply is configured to provide alternating current (AC) to the conductive coating.

14 Claims, 3 Drawing Sheets

(56) References Cited

U.S. PATENT DOCUMENTS

| | | | |
|---|---|---|---|
| 5,328,768 A | 7/1994 | Goodwin | |
| 5,385,872 A | 1/1995 | Gulotta et al. | |
| 5,393,593 A | 2/1995 | Gulotta et al. | |
| 5,492,750 A | 2/1996 | Shumaker, Jr. et al. | |
| 5,653,903 A | 8/1997 | Pinchok, Jr. et al. | |
| 5,750,267 A | 5/1998 | Takase et al. | 428/469 |
| 5,796,055 A | 8/1998 | Benson, Jr. et al. | |
| 5,821,001 A | 10/1998 | Arbab et al. | |
| 6,130,645 A | 10/2000 | Lindenmeier et al. | 343/704 |
| 6,144,017 A * | 11/2000 | Millett et al. | 219/522 |
| 6,265,076 B1 | 7/2001 | McCurdy et al. | |
| 6,495,251 B1 | 12/2002 | Arbab et al. | |
| 6,570,709 B2 | 5/2003 | Katayama et al. | |
| 6,869,644 B2 | 3/2005 | Buhay et al. | |
| 6,916,542 B2 | 7/2005 | Buhay et al. | |
| 6,962,759 B2 | 11/2005 | Buhay et al. | |
| 7,232,615 B2 | 6/2007 | Buhay et al. | |
| 7,311,961 B2 | 12/2007 | Finley et al. | |
| 2002/0172775 A1 | 11/2002 | Buhay et al. | |
| 2003/0180547 A1 | 9/2003 | Finley et al. | |
| 2003/0228476 A1 | 12/2003 | Buhay et al. | |
| 2006/0086715 A1 | 4/2006 | Briggs | 219/488 |

\* cited by examiner

VEHICLE TRANSPARENCY HEATED WITH ALTERNATING CURRENT

BACKGROUND OF THE INVENTION

1. Field of the Invention

This invention relates generally to vehicle transparencies, such as vehicle windshields, and, in one particular embodiment, to a heatable vehicle windshield.

2. Technical Considerations

It has been known to pass direct current (DC) through a conductor (e.g., a wire or an electrically conductive coating) on a laminated vehicle windshield in order to raise the temperature of the windshield. This is particularly useful in colder climates for defogging and to melt ice and snow on the windshield.

In wire-heated windshields, fine electrically-conductive wires are placed between the windshield plies. The wires are connected to the output of a conventional vehicle alternator to supply direct current (DC) electricity to the wires. The wires have sufficiently low resistance to provide the windshield with a power density of 5 to 7 watts per decimeter squared ($W/dm^2$).

However, a problem with wire-heated windshields is that the wires can be seen by the vehicle occupants. The presence of these wires can be aesthetically undesirable and can interfere with visibility through the windshield. If the diameter of the wires is decreased to try to reduce the visibility of the wires, the number of wires must be increased to maintain the desired power density. The increased number of wires adversely decreases the total solar energy transmitted (TSET) of the windshield.

In an effort to address this problem, some heated windshields utilize transparent, conductive coatings rather than wires to heat the windshield. While these known transparent coatings overcome the aesthetic and visibility problems associated with the use of wires, windshields heated by these coatings also have some drawbacks. For example, conventional heated windshield coatings typically have a sheet resistance of 2 ohms per square ($\Omega/\square$) or greater. A conventional vehicle alternator (14 volt (v) DC; 80 ampere; 1,120 watts) does not provide sufficient voltage to heat the windshield to a temperature sufficient for de-icing. Therefore, for vehicles utilizing conductive coatings rather than conductive wires, the vehicles must be altered to increase the available DC voltage. One way to do this is to replace the conventional alternator with an alternator that supplies more direct current output, such as a 42 v DC (2,500 W to 5,000 W) alternator. Another way to address this problem is to maintain the conventional 14 v DC alternator but add a DC to DC converter to step up the direct current voltage from the alternator to a sufficient level, e.g., 42 v DC, to heat the windshield to a commercially acceptable level.

However, replacing the conventional alternator or adding a DC to DC converter increases the cost and complexity of the vehicle electrical system.

Another solution has been to divide the coating into several electrically isolated sections and supply DC power to each individual section. However, this also increases the cost and complexity of the windshield.

Therefore, it would be desirable to provide a transparency, such as a laminated vehicle transparency, that reduces or eliminates at least some of the problems associated with conventional heatable transparencies.

SUMMARY OF THE INVENTION

A heatable transparency comprises a substrate and an electrically conductive coating formed over at least a portion of the substrate. A power supply is in contact with the conductive coating. The power supply is configured to provide alternating current (AC) to the conductive coating.

A heatable vehicle transparency of the invention comprises a first ply having a No. 1 surface and a No. 2 surface and a second ply having a No. 3 surface and a No. 4 surface, with the No. 2 surface facing the No. 3 surface. An electrically conductive coating is formed over at least a portion of the No. 2 or No. 3 surface. A power supply is in contact with the conductive coating, the power supply configured to provide alternating current to the conductive coating.

Another heatable vehicle transparency comprises a first glass ply having a No. 1 surface and a No. 2 surface and a second glass ply having a No. 3 surface and a No. 4 surface, with the No. 2 surface facing the No. 3 surface. An electrically conductive coating is formed over at least a portion of the No. 2 or No. 3 surface, with the conductive coating comprising at least three metallic silver layers. A power supply is in contact with the conductive coating to supply AC power to the conductive coating. The power supply comprises an alternator comprising at least one coil generating AC power. The conductive coating is in electrical contact with the at least one coil. A transformer is connected to the at least one coil and the conductive coating.

A method of heating a vehicle transparency having a conductive coating comprises providing a substrate having an electrically conductive coating formed over at least a portion of the substrate, and connecting the conductive coating to a source of AC power. In one embodiment, the source of AC power comprises an alternator comprising at least one coil generating AC power, with the conductive coating in electrical contact with at the at least one coil.

BRIEF DESCRIPTION OF THE DRAWINGS

The invention will be described with reference to the following drawing figures wherein like reference numbers identify like parts throughout.

DESCRIPTION OF THE PREFERRED EMBODIMENTS

Figure 1:
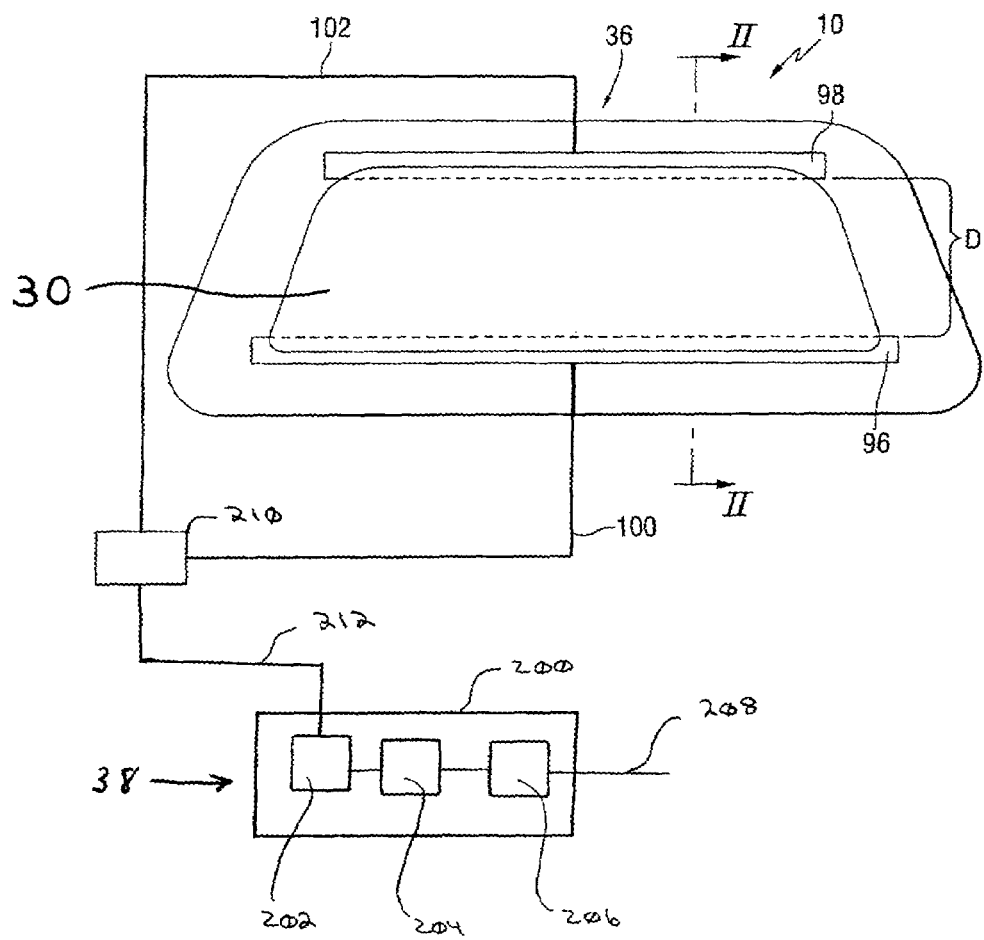
FIG. 1 is a schematic view (not to scale) of a heatable windshield incorporating features of the invention.

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Further, as used herein, the terms "formed over", "deposited over", or "provided over" mean formed, deposited, or provided on but not necessarily in contact with the surface. For example, a coating layer "formed over" a substrate does not preclude the presence of one or more other coating layers or films of the same or different composition located between the formed coating layer and the substrate. As used herein, the terms "polymer" or "polymeric" include oligomers, homopolymers, copolymers, and terpolymers, e.g., polymers formed from two or more types of monomers or polymers. The terms "visible region" or "visible light" refer to electromagnetic radiation having a wavelength in the range of 380 nm to 800 nm. The terms "infrared region" or "infrared radiation" refer to electromagnetic radiation having a wavelength in the range of greater than 800 nm to 100,000 nm. The terms "ultraviolet region" or "ultraviolet radiation" mean electromagnetic energy having a wavelength in the range of 300 nm to less than 380 nm. Additionally, all documents, such as but not limited to issued patents and patent applications, referred to herein are to be considered to be "incorporated by reference" in their entirety. The "visible transmittance" and "dominant wavelength" values are those determined using the conventional methods. Those skilled in the art will understand that properties such as visible transmittance and dominant wavelength can be calculated at an equivalent standard thickness, e.g., 5.5 mm, even though the actual thickness of a measured glass sample is different than the standard thickness.

For purposes of the following discussion, the invention will be discussed with reference to use with a vehicle "transparency". As used herein, the term "vehicle transparency" refers to any vehicle structure that is designed to be looked through on a vehicle, such as but not limited to windshields, sidelights, back lights, sunroofs, and moon roofs, just to name a few. However, it is to be understood that the invention is not limited to use with vehicle transparencies but could be practiced with transparencies in any desired field, such as but not limited to laminated or non-laminated residential and/or commercial windows, insulating glass units, and/or transparencies for land, air, space, above water and under water vehicles. Therefore, it is to be understood that the specifically disclosed exemplary embodiments are presented simply to explain the general concepts of the invention and that the invention is not limited to these specific exemplary embodiments. Additionally, while a typical vehicle "transparency" can have sufficient visible light transmittance such that materials can be viewed through the transparency, in the practice of the invention the "transparency" need not be transparent to visible light but may be translucent or opaque (as described below). Non-limiting examples of vehicle windshields and methods of making the same are found in U.S. Pat. Nos. 4,820,902; 5,028,759; and 5,653,903.

Figure 2:
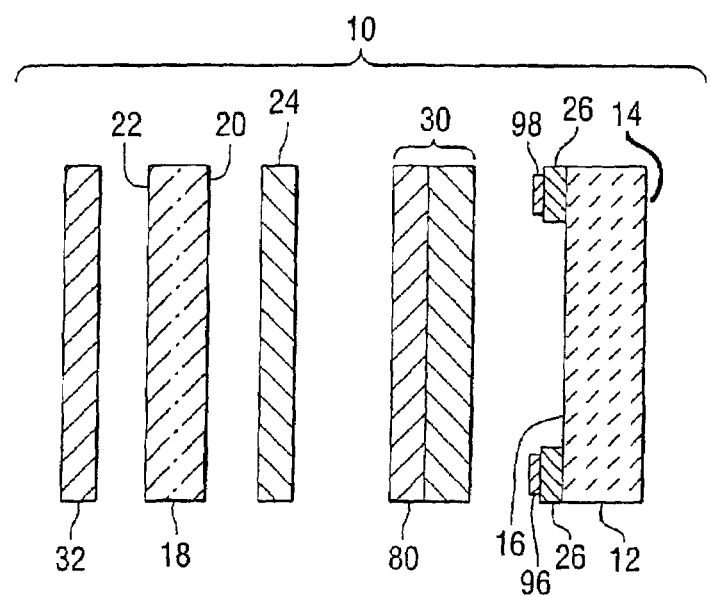
FIG. 2 is an expanded view (not to scale) of the windshield taken along the line II-II of FIG. 1.

A non-limiting heatable transparency 10 (e.g., automotive windshield) incorporating features of the invention is illustrated in FIGS. 1 and 2. The transparency 10 can have any desired visible light, infrared radiation, or ultraviolet radiation transmission and reflection. For example, the transparency 10 can have a visible light transmission of any desired amount, e.g., greater than 0% to 100%, e.g., greater than 70%. For windshield and front sidelight areas in the United States, the visible light transmission is typically greater than or equal to 70%. For privacy areas, such as rear seat sidelights and rear windows, the visible light transmission can be less than that for windshields, such as less than 70%.

As best seen in FIG. 2, the transparency 10 includes a first ply 12 with a first major surface facing the vehicle exterior, i.e., an outer major surface 14 (No. 1 surface) and an opposed second or inner major surface 16 (No. 2 surface). The transparency 10 also includes a second ply 18 having an outer (first) major surface 20 (No. 3 surface) and an inner (second) major surface 22 (No. 4 surface). This numbering of the ply surfaces is in keeping with conventional practice in the automotive art. The first and second plies 12, 18 can be bonded together in any suitable manner, such as by a conventional interlayer 24. Although not required, a conventional edge sealant (not shown) can be applied to the perimeter of the laminated transparency 10 during and/or after lamination in any desired manner. A decorative band, e.g., an opaque, translucent or colored shade band 26 (shown in FIG. 2), such as a ceramic band, can be provided on a surface of at least one of the plies 12, 18, for example around the perimeter of the inner major surface 16 of the first ply 12. An electrically conductive coating 30 is formed over at least a portion of one of the plies 12, 18, such as over the No. 2 surface 16 or No. 3 surface 20. Although not required, in one non-limiting embodiment, an antireflective coating 32 is formed over at least one of the surfaces, such as over the No. 4 surface 22. A bus bar assembly 36 (FIG. 1) is in electrical contact with the conductive coating 30. The bus bar assembly 36 is also connected to an electrical power source 38 (FIG. 1), which will be discussed in more detail below. In the practice of the invention, the power source 38 is a source of alternating current (AC) power. Thus, in the practice of the invention, AC current rather than DC current is used to power the transparency 10.

In the broad practice of the invention, the plies 12, 18 of the transparency 10 can be of the same or different materials. The plies 12, 18 can include any desired material having any desired characteristics. For example, one or more of the plies 12, 18 can be transparent or translucent to visible light. By "transparent" is meant having visible light transmittance of greater than 0% to 100%. Alternatively, one or more of the plies 12, 18 can be translucent. By "translucent" is meant allowing electromagnetic energy (e.g., visible light) to pass through but diffusing this energy such that objects on the side opposite the viewer are not clearly visible. Examples of suitable materials include, but are not limited to, plastic substrates (such as acrylic polymers, such as polyacrylates; polyalkylmethacrylates, such as polymethyl methacrylates, polyethyl methacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, one or more of the plies 12, 18 can include conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible transmission, ultraviolet transmission, infrared transmission, and/or total solar energy transmission. By "float glass" is meant glass formed by a conventional float process in which molten glass is deposited onto a molten metal bath and controllably cooled to form a float glass ribbon. The ribbon is then cut and/or shaped and/or heat treated as desired. Examples of float glass processes are disclosed in U.S. Pat. Nos. 4,466,562 and 4,671,155. The first and second plies 12, 18 can each be, for example, clear float glass or can be tinted or colored glass or one ply 12, 18 can be clear glass and the other ply 12, 18 colored glass. Although not limiting to the invention, examples of glass suitable for the first ply 12 and/or second ply 18 are described in U.S. Pat. Nos. 4,746,347; 4,792,536; 5,030,593; 5,030,594; 5,240,886; 5,385,872; and 5,393,593. The first and second plies 12, 18 can be of any desired dimensions, e.g., length, width, shape, or thickness. In one exemplary automotive transparency, the first and second plies can each be 1 mm to 10 mm thick, e.g., 1 mm to 5 mm thick, or 1.5 mm to 2.5 mm, or 1.8 mm to 2.3 mm. The glass composition for the first ply 12 and/or second ply 18 can have a total iron content in the range of greater than 0 wt. % to 1.0 wt. %, e.g., 0.1 wt. % to 0.6 wt. %, and/or a redox ratio in the range of 0.2 to 0.6.

In one non-limiting embodiment, one or both of the plies 12, 18 can have a high visible light transmittance at a reference wavelength of 550 nanometers (nm). By "high visible light transmittance" is meant visible light transmittance at 550 nm greater than or equal to 85%, such as greater than or equal to 87%, such as greater than or equal to 90%, such as greater than or equal to 91%, such as greater than or equal to 92%, at 5.5 mm equivalent thickness for glass from 2 mm to 25 mm sheet thickness. Particularly useful glass for the practice of the invention is disclosed in U.S. Pat. Nos. 5,030,593 and 5,030,594 and is commercially available from PPG Industries, Inc. under the mark Starphire®.

The interlayer 24 can be of any desired material and can include one or more layers or plies. The interlayer 24 can be a polymeric or plastic material, such as, for example, polyvinylbutyral, plasticized polyvinyl chloride, or multi-layered thermoplastic materials including polyethyleneterephthalate, etc. Suitable interlayer materials are disclosed, for example but not to be considered as limiting, in U.S. Pat. Nos. 4,287,107 and 3,762,988. The interlayer 24 secures the first and second plies 12, 18 together, provides energy absorption, reduces noise, and increases the strength of the laminated structure. The interlayer 24 can also be a sound-absorbing or attenuating material as described, for example, in U.S. Pat. No. 5,796,055. The interlayer 24 can have a solar control coating provided thereon or incorporated therein or can include a colored material to reduce solar energy transmission.

The coating 30 is an electrically conductive coating and is deposited over at least a portion of a major surface of one of the glass plies 12, 18, such as on the inner surface 16 of the outboard glass ply 12 (FIG. 2) or the outer surface 20 of the inner glass ply 18. In one non-limiting embodiment, the conductive coating 30 can include one or more metallic films positioned between pairs of dielectric layers applied sequentially over at least a portion of one of the glass plies 12, 18. The conductive coating 30 can be a heat and/or radiation reflecting coating and can have one or more coating layers or films of the same or different composition and/or functionality. As used herein, the term "film" refers to a coating region of a desired or selected coating composition. A "layer" can comprise one or more "films" and a "coating" or "coating stack" can comprise one or more "layers". For example, the conductive coating 30 can be a single layer coating or a multi-layer coating and can include one or more metals, non-metals, semi-metals, semiconductors, and/or alloys, compounds, compositions, combinations, or blends thereof. For example, the conductive coating 30 can be a single layer metal oxide coating, a multiple layer metal oxide coating, a non-metal oxide coating, a metallic nitride or oxynitride coating, a non-metallic nitride or oxynitride coating, or a multiple layer coating comprising one or more of any of the above materials. In one non-limiting embodiment, the conductive coating 30 can be a doped metal oxide coating.

The coating 30 can be a functional coating. As used herein, the term "functional coating" refers to a coating that modifies one or more physical properties of the substrate over which it is deposited, e.g., optical, thermal, chemical or mechanical properties, and is not intended to be entirely removed from the substrate during subsequent processing. The conductive coating 30 can have one or more functional coating layers or films of the same or different composition or functionality.

The conductive coating 30 can be, for example, an electrically conductive coating used to make heatable windows as disclosed in U.S. Pat. Nos. 5,653,903 and 5,028,759, or a single-film or multi-film coating used as an antenna. Likewise, the conductive coating can be a conductive, solar control coating. As used herein, the term "solar control coating" refers to a coating comprised of one or more layers or films that affect the solar properties of the coated article, such as but not limited to the amount of solar radiation, for example, visible, infrared, or ultraviolet radiation, reflected from, absorbed by, or passing through the coated article, shading coefficient, emissivity, etc. The solar control coating can block, absorb or filter selected portions of the solar spectrum, such as but not limited to the IR, UV, and/or visible spectrums. Examples of solar control coatings that can be used in the practice of the invention are found, for example but not to be considered as limiting, in U.S. Pat. Nos. 4,898,789; 5,821,001; 4,716,086; 4,610,771; 4,902,580; 4,716,086; 4,806,220; 4,898,790; 4,834,857; 4,948,677; 5,059,295; and 5,028,759, and also in U.S. patent application Ser. No. 09/058,440.

The conductive coating 30 can also be an electroconductive low emissivity coating that allows visible wavelength energy to be transmitted through the coating but reflects longer wavelength solar infrared energy. By "low emissivity" is meant emissivity less than 0.4, such as less than 0.3, such as less than 0.2, such as less than 0.1, e.g., less than or equal to 0.05. Examples of low emissivity coatings are found, for example, in U.S. Pat. Nos. 4,952,423 and 4,504,109 and British reference GB 2,302,102.

Non-limiting examples of suitable conductive coatings 30 for use with the invention are commercially available from PPG Industries, Inc. of Pittsburgh, Pa. under the SUNGATE® and SOLARBAN® families of coatings. Such coatings typically include one or more antireflective coating films comprising dielectric or anti-reflective materials, such as metal oxides or oxides of metal alloys, which are transparent to visible light. The conductive coating 30 can also include one or more infrared reflective films comprising a reflective metal, e.g., a noble metal such as gold, copper or silver, or combinations or alloys thereof, and can further comprise a primer film or barrier film, such as titanium, as is known in the art, located over and/or under the metal reflective layer. The conductive coating 30 can have any desired number of infrared reflective films, such as but not limited to 1 to 5 infrared reflective films. In one non-limiting embodiment, the coating 30 can have 1 or more silver layers, e.g., 2 or more silver layers, e.g., 3 or more silver layers, such as 5 or more silver layers. A non-limiting example of a suitable coating having three silver layers is disclosed in U.S. patent application Ser. No. 10/364,089 (Publication No. 2003/0180547 A1).

The conductive coating 30 can be deposited by any conventional method, such as but not limited to conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as but not limited to sol-gel deposition. In one non-limiting embodiment, the conductive coating 30 can be deposited by MSVD. Examples of MSVD coating devices and methods will be well understood by one of ordinary skill in the art and are described, for example, in U.S. Pat. Nos. 4,379,040; 4,861,669; 4,898,789; 4,898,790; 4,900,633; 4,920,006; 4,938,857; 5,328,768; and 5,492,750.

Figure 3:
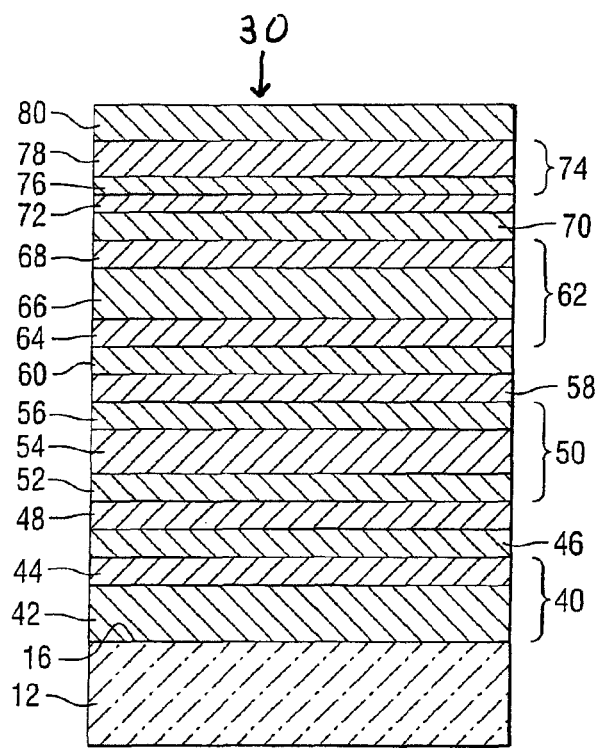
FIG. 3 is a cross-sectional view (not to scale) of a non-limiting conductive coating suitable for the invention.

An exemplary non-limiting coating 30 suitable for the invention is shown in FIG. 3. This exemplary coating 30 includes a base layer or first dielectric layer 40 deposited over at least a portion of a major surface of a substrate (e.g., the No. 2 surface 16 of the first ply 12). The first dielectric layer 40 can comprise one or more films of antireflective materials and/or dielectric materials, such as but not limited to metal oxides, oxides of metal alloys, nitrides, oxynitrides, or mixtures thereof. The first dielectric layer 40 can be transparent to visible light. Examples of suitable metal oxides for the first dielectric layer 40 include oxides of titanium, hafnium, zirconium, niobium, zinc, bismuth, lead, indium, tin, and mixtures thereof. These metal oxides can have small amounts of other materials, such as manganese in bismuth oxide, tin in indium oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. The first dielectric layer 40 can be a substantially single phase film, such as a metal alloy oxide film, e.g., zinc stannate, or can be a mixture of phases composed of zinc and tin oxides or can be composed of a plurality of metal oxide films, such as those disclosed in U.S. Pat. Nos. 5,821,001; 4,898,789; and 4,898,790.

In the illustrated exemplary embodiment shown in FIG. 3, the first dielectric layer 40 can comprise a multi-film structure having a first film 42, e.g., a metal alloy oxide film, deposited over at least a portion of the inner major surface 16 of the first ply 12 and a second film 44, e.g., a metal oxide or oxide mixture film, deposited over the first metal alloy oxide film 42. In one non-limiting embodiment, the first film 42 can be a zinc/tin alloy oxide. The zinc/tin alloy oxide can be that obtained from magnetron sputtering vacuum deposition from a cathode of zinc and tin that can comprise zinc and tin in proportions of 10 wt. % to 90 wt. % zinc and 90 wt. % to 10 wt. % tin. One suitable metal alloy oxide that can be present in the first film 42 is zinc stannate. By "zinc stannate" is meant a composition of $Zn_xSn_{1-x}O_{2-x}$ (Formula 1) where "x" varies in the range of greater than 0 to less than 1. For instance, "x" can be greater than 0 and can be any fraction or decimal between greater than 0 to less than 1. For example where $x=\frac{2}{3}$, Formula 1 is $Zn_{2/3}Sn_{1/3}O_{4/3}$, which is more commonly described as "$Zn_2SnO_4$". A zinc stannate-containing film has one or more of the forms of Formula 1 in a predominant amount in the film. In one non-limiting embodiment, the first film 42 comprises zinc stannate and has a thickness in the range of 100 Å to 500 Å, such as 150 Å to 400 Å, e.g., 200 Å to 300 Å, e.g., 260 Å.

The second film 44 can be a zinc-containing film, such as zinc oxide. The zinc oxide film can be deposited from a zinc cathode that includes other materials to improve the sputtering characteristics of the cathode. For example, the zinc cathode can include a small amount (e.g., less than 10 wt. %, such as greater than 0 to 5 wt. %) of tin to improve sputtering. In which case, the resultant zinc oxide film would include a small percentage of tin oxide, e.g., 0 to less than 10 wt. % tin oxide, e.g., 0 to 5 wt. % tin oxide. An oxide layer sputtered from a zinc/tin cathode having ninety-five percent zinc and five percent tin is written as $Zn_{0.95}Sn_{0.05}O_{1.05}$ herein and is referred to as a zinc oxide film. The small amount of tin in the cathode (e.g., less than 10 wt. %) is believed to form a small amount of tin oxide in the predominantly zinc oxide-containing second film 44. The second film 44 can have a thickness in the range of 50 Å to 200 Å, such as 75 Å to 150 Å, e.g., 100 Å. In one non-limiting embodiment in which the first film 42 is zinc stannate and the second film 44 is zinc oxide ($Zn_{0.95}Sn_{0.05}O_{1.05}$), the first dielectric layer 40 can have a total thickness of less than or equal to 1,000 Å, such as less than or equal to 500 Å, e.g., 300 Å to 450 Å, e.g., 350 Å to 425 Å, e.g., 400 Å.

A first heat and/or radiation reflective film or layer 46 can be deposited over the first dielectric layer 40. The first reflective layer 46 can include a reflective metal, such as but not limited to metallic gold, copper, silver, or mixtures, alloys, or combinations thereof. In one embodiment, the first reflective layer 46 comprises a metallic silver layer having a thickness in the range of 25 Å to 300 Å, e.g., 50 Å to 300 Å, e.g., 50 Å to 200 Å, such as 70 Å to 150 Å, such as 100 Å to 150 Å, e.g., 130 Å.

A first primer film 48 can be deposited over the first reflective layer 46. The first primer film 48 can be an oxygen-capturing material, such as titanium, that can be sacrificial during the deposition process to prevent degradation or oxidation of the first reflective layer 46 during the sputtering process or subsequent heating processes. The oxygen-capturing material can be chosen to oxidize before the material of the first reflective layer 46. If titanium is used as the first primer film 48, the titanium would preferentially oxidize to titanium dioxide before oxidation of the underlying silver layer. In one embodiment, the first primer film 48 is titanium having a thickness in the range of 5 Å to 50 Å, e.g., 10 Å to 40 Å, e.g., 15 Å to 25 Å, e.g., 20 Å.

An optional second dielectric layer 50 can be deposited over the first reflective layer 46 (e.g., over the first primer film 48). The second dielectric layer 50 can comprise one or more metal oxide or metal alloy oxide-containing films, such as those described above with respect to the first dielectric layer. In the illustrated non-limiting embodiment, the second dielectric layer 50 includes a first metal oxide film 52, e.g., a zinc oxide ($Zn_{0.95}Sn_{0.05}O_{1.05}$) film deposited over the first primer film 48. A second metal alloy oxide film 54, e.g., a zinc stannate ($Zn_2SnO_4$) film, can be deposited over the first zinc oxide ($Zn_{0.95}Sn_{0.05}O_{1.05}$) film 52. A third metal oxide film 56, e.g., another zinc/tin oxide layer ($Zn_{0.95}Sn_{0.05}O_{1.05}$), can be deposited over the zinc stannate layer to form a multi-film second dielectric layer 50. In one non-limiting embodiment, the zinc oxide ($Zn_{0.95}Sn_{0.05}O_{1.05}$) films 52, 56 of the second dielectric layer 50 can each have a thickness in the range of about 50 Å to 200 Å, e.g., 75 Å to 150 Å, e.g., 100 Å. The metal alloy oxide layer (zinc stannate) 54 can have a thickness in the range of 100 Å to 800 Å, e.g., 200 Å to 700 Å, e.g., 300 Å to 600 Å, e.g., 550 Å to 600 Å.

An optional second heat and/or radiation reflective layer 58 can be deposited over the second dielectric layer 50. The second reflective layer 58 can include any one or more of the reflective materials described above with respect to the first reflective layer 46. In one non-limiting embodiment, the second reflective layer 58 comprises silver having a thickness in the range of 25 Å to 200 Å, e.g., 50 Å to 150 Å, e.g., 80 Å to 150 Å, e.g., 100 Å to 150 Å, e.g., 130 Å. In another non-limiting embodiment, this second reflective layer 58 can be thicker than the first and/or third reflective layers (the third reflective layer to be discussed later).

An optional second primer film 60 can be deposited over the second reflective layer 58. The second primer film 60 can be any of the materials described above with respect to the first primer film 48. In one non-limiting embodiment, the second primer film includes titanium having a thickness in the range of about 5 Å to 50 Å, e.g., 10 Å to 25 Å, e.g., 15 Å to 25 Å, e.g., 20 Å.

An optional third dielectric layer 62 can be deposited over the second reflective layer 58 (e.g., over the second primer film 60). The third dielectric layer 62 can also include one or more metal oxide or metal alloy oxide-containing layers, such as discussed above with respect to the first and second dielectric layers 40, 50. In one non-limiting embodiment, the third dielectric layer 62 is a multi-film layer similar to the second dielectric layer 50. For example, the third dielectric layer 62 can include a first metal oxide layer 64, e.g., a zinc oxide ($Zn_{0.95}Sn_{0.05}O_{1.05}$) layer, a second metal alloy oxide-containing layer 66, e.g., a zinc stannate layer ($Zn_2SnO_4$), deposited over the zinc oxide layer 64, and a third metal oxide layer 68, e.g., another zinc oxide ($Zn_{0.95}Sn_{0.05}O_{1.05}$) layer, deposited over the zinc stannate layer 66. In one non-limiting embodiment, the zinc oxide layers 64, 68 can have thicknesses in the range of 50 Å to 200 Å, such as 75 Å to 150 Å, e.g., 100 Å. The metal alloy oxide layer 66 can have a thickness in the range of 100 Å to 800 Å, e.g., 200 Å to 700 Å, e.g., 300 Å to 600 Å, e.g., 550 Å to 600 Å.

In one non-limiting aspect of the invention, the second dielectric layer 50 and third dielectric layer 62 have thicknesses that are within 10% of each other, such as within 5%, such as within 2% to 3% of each other.

The coating 30 can further include an optional third heat and/or radiation reflective layer 70 deposited over the third dielectric layer 62. The third reflective layer 70 can be of any of the materials discussed above with respect to the first and second reflective layers. In one non-limiting embodiment, the third reflective layer 70 includes silver and has a thickness in the range of 25 Å to 300 Å, e.g., 50 Å to 300 Å, e.g., 50 Å to 200 Å, such as 70 Å to 150 Å, such as 100 Å to 150 Å, e.g., 120 Å. In one non-limiting aspect of the invention, the first reflective layer 46 and third reflective layer 70 have thicknesses that are within 10% of each other, such as within 5%, such as within 2% to 3% of each other.

An optional third primer film 72 can be deposited over the third reflective layer 70. The third primer film 72 can be of any of the primer materials described above with respect to the first or second primer films. In one non-limiting embodiment, the third primer film is titanium and has a thickness in the range of 5 Å to 50 Å, e.g., 10 Å to 25 Å, e.g., 20 Å.

An optional fourth dielectric layer 74 can be deposited over the third reflective layer (e.g., over the third primer film 72). The fourth dielectric layer 74 can be comprised of one or more metal oxide or metal alloy oxide-containing layers, such as those discussed above with respect to the first, second, or third dielectric layers 40, 50, 62. In one non-limiting embodiment, the fourth dielectric layer 74 is a multi-film layer having a first metal oxide layer 76, e.g., a zinc oxide ($Zn_{0.95}Sn_{0.05}O_{1.05}$) layer, deposited over the third primer film 72, and a second metal alloy oxide layer 78, e.g., a zinc stannate layer ($Zn_2SnO_4$), deposited over the zinc oxide layer

76. The zinc oxide layer 76 can have a thickness in the range of 25 Å to 200 Å, such as 50 Å to 150 Å, such as 100 Å. The zinc stannate layer 78 can have a thickness in the range of 25 Å to 500 Å, e.g., 50 Å to 500 Å, e.g., 100 Å to 400 Å, e.g., 200 Å to 300 Å, e.g., 260 Å.

The coating 30 can contain additional groups of dielectric layer/reflective metal layer/primer layer units if desired. In one non-limiting embodiment, the coating 30 can contain up to five antireflective metal layers, e.g., up to five silver layers.

In one non-limiting embodiment of the invention, the coating 30 is configured or dimensioned to provide a power density of 2 to 10 watts per decimeter$^2$ (W/dm$^2$) at a bus bar to bus bar distance D (see FIG. 1) in the range of 24 inches to 30 inches (60 cm to 75 cm), such as 4 to 8 W/dm$^2$, such as 5 to 6 W/dm$^2$, when the coating is in electrical contact with a conventional vehicle alternator, such as a conventional alternator producing 80 amps and 14 volts. It is believed that such a power density is sufficient to melt ice found in contact with outer surface 14 of the substrate 10. For vision panels (such as a windshield) in the United States, the transparency should also have a visible light transmittance of greater than or equal to 70%, such as greater than or equal to 71%. As will be appreciated by one skilled in the art, several different competing factors need to be balanced to provide a coating having sufficient conductivity and also sufficient transmittance. For example, as the distance D between the bus bars increases (i.e., the transparency becomes wider from top to bottom), the bus bar to bus bar resistance increases. As the bus bar to bus bar resistance increases, the power density decreases. In order to maintain the power density as the bus bar to bus bar distance is increased, the resistivity of the coating must decrease. One way of decreasing the resistivity is by increasing the thickness of one or more of the silver layers and/or by increasing the number of silver layers. In one non-limiting practice of the invention, the thickness and/or number of silver layers is configured to give a total resistivity for the coating of 0.6 to 1.7Ω/□, such as 0.8 to 1.3Ω/□, such as 0.9 to 1.1Ω/□. However, as will also be appreciated by one skilled in the art, as the number or thickness of the silver layers increases, the visible light transmittance decreases. For forward vision areas of a vehicle, such as a windshield, the thickness and/or number of silver layers should not be increased to the point where visible light transmittance of the vision area falls below about 70%.

The coating 30 can include a protective overcoat 80, which, for example in the non-limiting embodiment shown in FIG. 3, is deposited over the optional fourth dielectric layer 74 (if present), to assist in protecting the underlying layers, such as the antireflective layers, from mechanical and chemical attack during processing. The protective coating 80 can be an oxygen barrier coating layer to prevent or reduce the passage of ambient oxygen into the underlying layers of the coating 30, such as during heating or bending. The protective coating 80 can be of any desired material or mixture of materials. In one exemplary embodiment, the protective coating 80 can include a layer having one or more metal oxide materials, such as but not limited to oxides of aluminum, silicon, or mixtures thereof. For example, the protective coating 80 can be a single coating layer comprising in the range of 0 wt. % to 100 wt. % alumina and/or 100 wt. % to 0 wt. % silica, such as 5 wt. % to 95 wt. % alumina and 95 wt. % to 5 wt. % silica, such as 10 wt. % to 90 wt. % alumina and 90 wt. % to 10 wt. % silica, such as 15 wt. % to 90 wt. % alumina and 85 wt. % to 10 wt. % silica, such as 50 wt. % to 75 wt. % alumina and 50 wt. % to 25 wt. % silica, such as 50 wt. % to 70 wt. % alumina and 50 wt. % to 30 wt. % silica, such as 35 wt. % to 100 wt. % alumina and 65 wt. % to 0 wt. % silica, e.g., 70 wt.

% to 90 wt. % alumina and 30 wt. % to 10 wt. % silica, e.g., 75 wt. % to 85 wt. % alumina and 25 wt. % to 15 wt. % of silica, e.g., 88 wt. % alumina and 12 wt. % silica, e.g., 65 wt. % to 75 wt. % alumina and 35 wt. % to 25 wt. % silica, e.g., 70 wt. % alumina and 30 wt. % silica, e.g., 60 wt. % to less than 75 wt. % alumina and greater than 25 wt. % to 40 wt. % silica. In one particular non-limiting embodiment, the protective overcoat 80 comprises 40 wt. % to 60 wt. % alumina and 60 wt. % to 40 wt. % silica. Other materials, such as aluminum, chromium, hafnium, yttrium, nickel, boron, phosphorous, titanium, zirconium, and/or oxides thereof, can also be present, such as to adjust the refractive index of the protective coating 80. In one non-limiting embodiment, the refractive index of the protective coating 80 can be in the range of 1 to 3, such as 1 to 2, such as 1.4 to 2, such as 1.4 to 1.8.

In one non-limiting embodiment, the protective coating 80 is a combination silica and alumina coating. The protective coating 80 can be sputtered from two cathodes (e.g., one silicon and one aluminum) or from a single cathode containing both silicon and aluminum. This silicon/aluminum oxide protective coating 80 can be written as $Si_xAl_{1-x}O_{1.5+x/2}$, where x can vary from greater than 0 to less than 1.

Alternatively, the protective coating 80 can be a multi-layer coating formed by separately formed layers of metal oxide materials, such as but not limited to a bilayer formed by one metal oxide-containing layer (e.g., a silica and/or alumina-containing first layer) formed over another metal oxide-containing layer (e.g., a silica and/or alumina-containing second layer). The individual layers of the multi-layer protective coating can be of any desired thickness.

The protective coating can be of any desired thickness. In one non-limiting embodiment, the protective coating 80 is a silicon/aluminum oxide coating ($Si_xAl_{1-x}O_{1.5+x/2}$) having a thickness in the range of 50 Å to 50,000 Å, such as 50 Å to 10,000 Å, such as 100 Å to 1,000 Å, e.g., 100 Å to 500 Å, such as 100 Å to 400 Å, such as 200 Å to 300 Å, such as 250 Å. Further, the protective coating 80 can be of non-uniform thickness. By "non-uniform thickness" is meant that the thickness of the protective coating 80 can vary over a given unit area, e.g., the protective coating 80 can have high and low spots or areas.

In another non-limiting embodiment, the protective coating 80 can comprise a first layer and a second layer formed over the first layer. In one specific non-limiting embodiment, the first layer can comprise alumina or a mixture or alloy comprising alumina and silica. For example, the first layer can comprise a silica/alumina mixture having greater than 5 wt. % alumina, such as greater than 10 wt. % alumina, such as greater than 15 wt. % alumina, such as greater than 30 wt. % alumina, such as greater than 40 wt. % alumina, such as 50 wt. % to 70 wt. % alumina, such as in the range of 70 wt. % to 100 wt. % alumina and 30 wt. % to 0 wt. % silica. In one non-limiting embodiment, the first layer can have a thickness in the range of greater than 0 Å to 1 micron, such as 50 Å to 100 Å, such as 100 Å to 250 Å, such as 100 Å to 150 Å. The second layer can comprise silica or a mixture or alloy comprising silica and alumina. For example, the second layer can comprise a silica/alumina mixture having greater than 40 wt. % silica, such as greater than 50 wt. % silica, such as greater than 60 wt. % silica, such as greater than 70 wt. % silica, such as greater than 80 wt. % silica, such as in the range of 80 wt. % to 90 wt. % silica and 10 wt. % to 20 wt. % alumina, e.g., 85 wt. % silica and 15 wt. % alumina. In one non-limiting embodiment, the second layer can have a thickness in the range of greater than 0 Å to 2 microns, such as 50 Å to 5,000 Å, such as 50 Å to 2,000 Å, such as 100 Å to 1,000 Å, such as 300 Å to 500 Å, such as 350 Å to 400 Å. Non-limiting examples of suitable protective coatings are described, for example, in U.S. patent application Ser. Nos. 10/007,382; 10/133,805; 10/397,001; 10/422,094; 10/422,095; and 10/422,096.

Figure 4:
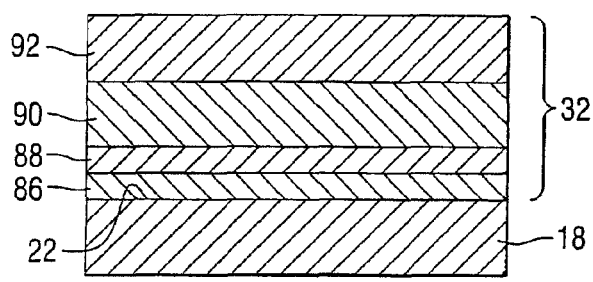
FIG. 4 is a cross-sectional view (not to scale) of a non-limiting antireflective coating suitable for the invention.

The transparency 10 further includes an antireflective coating 32, for example on the No. 4 surface 22 of the second ply 18. In one non-limiting embodiment, the antireflective coating 32 comprises alternating layers of relatively high and low index of refraction materials. A "high" index of refraction material is any material having a higher index of refraction than that of the "low" index material. In one non-limiting embodiment, the low index of refraction material is a material having an index of refraction of less than or equal to 1.75. Non-limiting examples of such materials include silica, alumina, and mixtures or combinations thereof. The high index of refraction material is a material having an index of refraction of greater than 1.75. Non-limiting examples of such materials include zirconia and zinc stannate. The antireflective coating 32 can be, for example but not limiting to the present invention, a multi-layer coating as shown in FIG. 4 having a first metal alloy oxide layer 86 (first layer), a second metal oxide layer 88 (second layer), a third metal alloy oxide layer 90 (third layer), and a metal oxide top layer 92 (fourth layer). In one non-limiting embodiment, the fourth layer 92 is an upper low index layer comprising silica or alumina or a mixture or combination thereof. The third layer 90 is an upper high index layer comprising zinc stannate or zirconia or mixtures or combinations thereof. The second layer 88 is a bottom low index layer comprising silica or alumina or a mixture or combination thereof. The first layer 86 is a bottom high index layer comprising zinc stannate or zirconia or mixtures or combinations thereof. In one non-limiting embodiment, the top layer 92 comprises silica and ranges from 0.7 to 1.5 quarter wave, e.g., 0.71 to 1.45 quarter wave, such as 0.8 to 1.3 quarter wave, such as 0.9 to 1.1 quarter wave. By "quarter wave" is meant: physical layer thickness·4·refractive index/ (reference wavelength of light). In this discussion, the reference wavelength of light is 550 nm. In this non-limiting embodiment, the thickness of the upper high index layer 90 is defined by the formula: $-0.3987 \cdot$(quarter wave value of top layer)$^2 - 1.1576 \cdot$(quarter wave value of top layer)$+2.7462$. Thus, if the top layer 92 is 0.96 quarter wave, the upper high index layer 90 would be $-0.3987(0.96)^2 - 1.1576(0.96)+2.7462=1.2675$ quarter wave. The bottom low index layer 88 is defined by the formula: $2.0567 \cdot$(quarter wave value of top layer)$^2 - 3.5663 \cdot$(quarter wave value of top layer)$+1.8467$. The bottom high index layer 86 is defined by the formula: $-2.1643 \cdot$(quarter wave value of top layer)$^2 + 4.6684 \cdot$(quarter wave value of top layer)$-2.2187$. In one specific non-limiting embodiment, the antireflective coating 32 comprises a top layer 92 of silica of 0.96 quarter wave (88.83 nm), a layer 90 of zinc stannate of 1.2675 quarter wave (84.72 nm), a layer 88 of silica of 0.3184 quarter wave (29.46 nm), and a layer 86 of zinc stannate of 0.2683 quarter wave (17.94 nm). In other non-limiting embodiments, the quarter wave values of the layers 86, 88, and 90 can vary by ±25% from the formula values above, such as ±10%, such as ±5%.

Other suitable antireflective coatings are disclosed in U.S. Pat. No. 6,265,076 at column 2, line 53 to column 3, line 38; and Examples 1-3. Further suitable antireflective coatings are disclosed in U.S. Pat. No. 6,570,709 at column 2, line 64 to column 5, line 22; column 8, lines 12-30; column 10, line 65 to column 11, line 11; column 13, line 7 to column 14, line 46; column 16, lines 35-48; column 19, line 62 to column 21, line 4; Examples 1-13; and Tables 1-8.

In the non-limiting embodiment illustrated in FIGS. 1 and 2, the bus bar assembly 36 includes a first or bottom bus bar 96 and a second or top bus bar 98 formed on the inner surface 16 of the outer ply 12 and separated by a bus bar to bus bar distance D. The bus bars 96, 98 are in electrical contact with the conductive coating 30. The bus bar assembly also includes a first conductive lead 100 connected to the first bus bar 96 and a second conductive lead 102 connected to the second bus bar 98. Each of the leads 100, 102 is in electrical contact with the power source 38. The bus bars 96, 98 and/or the conductive leads 100, 102 can be formed of conductive metal foil or strips (such as but not limited to copper foil or tinned copper foil), or can be formed by conductive coatings (such as ceramic coatings), or by conductive wires, or combinations thereof. In one non-limiting embodiment of the invention, bus bars 96 and 98 can be positioned at least partially on, or completely on, the decorative band 26 (as shown in FIG. 2).

In the broad practice of the invention, the power source 38 can be any power source configured to supply AC power to the transparency 10. However, in one non-limiting embodiment, the power source 38 comprises the coils of a conventional vehicle alternator 200. As will be appreciated by one skilled in the automotive art, a vehicle alternator is used to charge the vehicle battery and to power the vehicle's electrical systems when the engine is running. The alternator 200 generates electricity when a rotating magnet (rotor) rotates within a stationary set of wound coils (stator). Most conventional alternators have four sets of coils. One set of coils generates the magnetic field and the other three sets of coils (identified by reference number 202 in FIG. 1) pick up the magnetic field. The AC current generated from the coils 202 is directed to a set of rectifiers 204 (such as diode bridges) to convert the AC power from the coils 202 into DC power. Most alternators include a voltage regulator 206 to modulate the operation of the alternator to produce a DC output 208 of a constant voltage no matter what the demand. If demand for DC power increases, the voltage regulator 206 commands the alternator to increase output and if the demand decreases the voltage regulator 206 commands the alternator to decrease output. This DC output 208 is used to power the vehicle's electrical systems which, in the past, have included heatable windshields. The structure and operation of a conventional vehicle alternator will be well understood by one of ordinary skill in the art and, hence, will not be discussed in any further detail. However, conventional alternators simply cannot generate sufficient DC voltage to heat a conventional conductive coating to a temperature sufficient to de-ice a conventional automotive windshield.

However, in the practice of the invention, AC power is tapped from the alternator coils 202 to provide electricity to the coating 30 rather than using the DC output 208 of the rectifier 204, as is done in previous systems. In one non-limiting embodiment, one or more of the coils 202 can be in electrical contact with a transformer 210, such as by one or more electrically conductive cables or lines 212. The transformer 210 supplies AC power to the conductive coating 30 in any conventional manner, such as by leads 100, 102. The transformer 210 can be a conventional fixed output transformer. Alternatively, the transformer 210 can be a variable transformer configured to increase or decrease the AC voltage supplied from the coils 202. In one non-limiting embodiment, the transformer 210 can regulate the AC power from the coils 202 (and hence supplied to the coating 30) to be in the range of 2 volts to 42 volts, such as in the range of 6 volts to 28 volts, such as in the range of 8 volts to 14 volts.

Operation of the assembly of the invention will now be described. When it is desired to supply electrical power to the transparency 10, such as for defogging or deicing, the transformer 210 is activated. AC power from the coils 202 is directed to the transformer 210 and then to the coating 30. Any decrease in DC output 208 from the alternator 200 that this may cause is sensed by the voltage regulator 206 and is compensated for. The power required at the transparency 10 may vary depending upon the desired use. For example, defogging can utilize less power than deicing. Therefore, in one non-limiting practice of the invention, for defogging operations the transformer 210 can decrease the 14 v AC power supplied from the coils 202. For example, the transformer 210 can decrease the AC voltage to be in the range of 6 v to 8 v for defogging. For deicing operations, the transformer 210 can increase the 14 v AC power from the coils, e.g., up to 28 v, such as up to 42 v.

Thus, in the practice of the invention, AC power rather than DC power is supplied to the conductive coating of a vehicle transparency. Utilizing AC power eliminates the need for larger, more powerful alternators and also eliminates the need for DC to DC converters.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A heatable vehicle transparency, comprising:
   a substrate;
   an undivided electrically conductive solar control coating formed over at least a portion of the substrate, wherein the coating has a sheet resistance in the range of 0.6 to 1.7 ohms per square, and wherein the coating comprises:
   a first dielectric layer comprising at least one of a zinc stannate layer and a zinc oxide layer;
   a first reflective layer over the first dielectric layer and comprising metallic silver;
   a second dielectric layer over the first reflective layer comprising at least one of a zinc stannate layer and a zinc oxide layer; and
   a second reflective layer over the second dielectric layer and comprising metallic silver;
   a transformer connected to the conductive coating;
   an alternating current power supply connected with the conductive coating via the transformer, wherein the alternating current power supply comprises at least one coil of a vehicle alternator such that alternating current from the vehicle alternator is supplied to the conductive coating, such that said electrically conductive coating is powered by alternating current; and
   a second substrate connected to the first substrate by a polymeric layer.

2. The transparency of claim 1, wherein the substrate comprises glass.

3. The transparency of claim 1, wherein the transformer is a variable transformer.

4. The transparency of claim 3, wherein the transformer is configured to supply alternating current in the range of 2 volts to 42 volts.

5. A heatable vehicle transparency, comprising:
   a first glass ply having a No. 1 surface and a No. 2 surface;
   a second glass ply secured to the first ply by a polymeric interlayer and having a No. 3 surface and a No. 4 surface, with the No. 2 surface facing the No. 3 surface;
   an undivided electrically conductive solar control coating formed over at least a portion of the No. 2 or No. 3 surface, wherein the coating has a sheet resistance in the range of 0.6 to 1.7 ohms per square, and wherein the coating comprises:
a first dielectric layer comprising at least one of a zinc stannate layer and a zinc oxide layer;
a first reflective layer over the first dielectric layer and comprising metallic silver;
a second dielectric layer over the first reflective layer comprising at least one of a zinc stannate layer and a zinc oxide layer;
a second reflective layer over the second dielectric layer and comprising metallic silver;
a third dielectric layer over the second reflective layer and comprising at least one of a zinc stannate layer and a zinc oxide layer;
a third reflective layer over the third dielectric layer and comprising metallic silver; and
a fourth dielectric layer over the third reflective layer and comprising at least one of a zinc stannate layer and a zinc oxide layer;
an alternating current power supply in contact with the conductive coating, wherein the alternating current power supply comprises an alternator comprising at least one coil generating AC power, with the conductive coating in electrical contact with the at least one coil;
a transformer connected to the coil and the conductive coating such that alternating current is supplied to the conductive coating, such that said electrically conductive coating is powered by alternating current.

6. The transparency of claim 5, wherein the transformer is a variable transformer.

7. The transparency of claim 6, wherein the transformer is configured to supply alternating current in the range of 2 volts to 42 volts.

8. A method of heating a vehicle transparency having a conductive coating, comprising:
providing a substrate having an undivided electrically conductive solar control coating formed over at least a portion of the substrate, wherein the coating has a sheet resistance in the range of 0.6 to 1.7 ohms per square, and wherein the coating comprises:
a first dielectric layer comprising at least one of a zinc stannate layer and a zinc oxide layer;
a first reflective layer over the first dielectric layer and comprising metallic silver;
a second dielectric layer over the first reflective layer comprising at least one of a zinc stannate layer and a zinc oxide layer; and
a second reflective layer over the second dielectric layer and comprising metallic silver;
connecting the conductive coating to a source of AC power, wherein the source of AC power comprises an alternator comprising at least one coil generating AC power, with the conductive coating in electrical contact with the at least one coil;
connecting a transformer to the coil and the conductive coating such that alternating current is supplied to the conductive coating such that said electrically conductive coating is powered by alternating current; and
connecting a second substrate to the first substrate by a polymeric layer.

9. The method of claim 8, wherein the transformer is a variable transformer and is configured to supply alternating current in the range of 2 volts to 42 volts.

10. The vehicle transparency of claim 1, wherein the conductive coating further comprises:
a third dielectric layer over the second reflective layer and comprising at least one of a zinc stannate layer and a zinc oxide layer;
a third reflective layer over the third dielectric layer and comprising metallic silver; and
a fourth dielectric layer over the third reflective layer and comprising at least one of a zinc stannate layer and a zinc oxide layer.

11. The method of claim 8, wherein the conductive coating further comprises:
a third dielectric layer over the second reflective layer and comprising at least one of a zinc stannate layer and a zinc oxide layer;
a third reflective layer over the third dielectric layer and comprising metallic silver; and
a fourth dielectric layer over the third reflective layer and comprising at least one of a zinc stannate layer and a zinc oxide layer.

12. The vehicle transparency of claim 1, wherein the dielectric layers consist of oxide layers.

13. The vehicle transparency of claim 5, wherein the dielectric layers consist of oxide layers.

14. The vehicle transparency of claim 8, wherein the dielectric layers consist of oxide layers.

* * * * *